United States Patent
Ahad et al.

(10) Patent No.: US 8,245,128 B1
(45) Date of Patent: Aug. 14, 2012

(54) INTELLIGENT CLIENT AGENT FOR A HYBRID ONLINE/OFFLINE APPLICATION

(75) Inventors: Rafiul Ahad, Fremont, CA (US); Pradeep B. Chulliyan, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1121 days.

(21) Appl. No.: 10/197,738

(22) Filed: Jul. 17, 2002

(51) Int. Cl.
*G06F 17/30* (2006.01)
*G06F 17/24* (2006.01)

(52) U.S. Cl. .................... 715/234; 205/208; 205/238

(58) Field of Classification Search ............... 709/217, 709/219, 215; 715/203, 513, 234, 229, 205, 715/208, 238; 707/1, 3, 10, 200
See application file for complete search history.

(56) References Cited

U.S. PATENT DOCUMENTS

| | | | | |
|---|---|---|---|---|
| 5,781,909 A * | 7/1998 | Logan et al. | .................. | 707/200 |
| 5,948,066 A * | 9/1999 | Whalen et al. | ................ | 709/229 |
| 5,978,828 A * | 11/1999 | Greer et al. | .................... | 709/224 |
| 6,035,324 A * | 3/2000 | Chang et al. | .................. | 709/203 |
| 6,070,184 A * | 5/2000 | Blount et al. | .................. | 709/200 |
| 6,311,187 B1 * | 10/2001 | Jeyaraman | ...................... | 707/10 |
| 6,349,290 B1 * | 2/2002 | Horowitz et al. | ............... | 705/35 |
| 6,507,867 B1 * | 1/2003 | Holland et al. | ............... | 709/219 |
| 6,516,310 B2 * | 2/2003 | Paulley | ................................. | 1/1 |
| 6,615,253 B1 * | 9/2003 | Bowman-Amuah | .......... | 709/219 |
| 6,636,873 B1 * | 10/2003 | Carini et al. | .................... | 707/201 |
| 6,654,766 B1 * | 11/2003 | Degenaro et al. | ..................... | 1/1 |
| 6,721,288 B1 * | 4/2004 | King et al. | .................... | 370/310 |
| 6,950,850 B1 * | 9/2005 | Leff et al. | ..................... | 709/203 |
| 7,051,084 B1 * | 5/2006 | Hayton et al. | ................ | 709/219 |
| 2001/0034771 A1 * | 10/2001 | Hutsch et al. | ................. | 709/217 |
| 2001/0047394 A1 * | 11/2001 | Kloba et al. | .................. | 709/217 |
| 2002/0057678 A1 * | 5/2002 | Jiang et al. | .................... | 370/353 |
| 2002/0193997 A1 * | 12/2002 | Fitzpatrick et al. | ........... | 704/270 |
| 2003/0106022 A1 * | 6/2003 | Goodacre et al. | ............. | 715/513 |
| 2003/0233404 A1 * | 12/2003 | Hopkins | ....................... | 709/203 |
| 2004/0001476 A1 * | 1/2004 | Islam et al. | ................... | 370/352 |

OTHER PUBLICATIONS

King et al, "Mobile Devices having improved operation during network unavailability", published Apr. 12, 2000, EP 0993 165 A2, pp. 1-37.*

Wu et al, "Energy Efficient Caching for Wireless Mobile Computing", published: 1996, pp. 336-343.*

(Continued)

*Primary Examiner* — Stephen Hong
*Assistant Examiner* — Wilson Tsui
(74) *Attorney, Agent, or Firm* — Shun Yao; Park, Vaughan, Fleming & Dowler LLP

(57) ABSTRACT

An intelligent client agent and a method for using the client agent to operate a hybrid online/offline client application. A mobile client device is configured with a client agent comprising a dispatcher for receiving and responding to page requests from a client browser, a cache for storing the presentation formats of pages, a database for storing data for the pages, a voice engine for interaction with the application user in audio, and a script engine for assembling a page to be presented graphically or aurally. Instead of storing each page (e.g., of an application) as a static composition, the presentation format of the page is stored separate from content (e.g., data). At the time of assembly, the desired content is retrieved and bound to the presentation format and provided to the user.

22 Claims, 15 Drawing Sheets

OTHER PUBLICATIONS

Chan et al, "A Framework for Cache Management fo Mobile Databases: Design and Evaluation", publisheer: Kluwer Academic publishers, published: 2001, pp. 23-57.*

Eric Giguere, Title: "Mobile Data Management: Challenges of Wireless and Offline Data Access", published: 2001, publisher: IEEE, pp. 227-228.*

Yagoub, et al.: Caching Strategies for Data-Intensive Web Sites. Proceedings of the $26_{th}$ VLDB Conference, Cairo, Egypt, 2000. pp. 188-199.

Florescu, et al.: Optimization of Run-time Management of Data Intensive Web Sites. Proceedings of the $25^{th}$ VLDB Conference, Edinburgh, Scotland, 1999. pp. 627-630.

* cited by examiner

Access Parameter

| Part# 602 | Warehouse# 604 | Quantity on Hand 606 |
|---|---|---|
| 1234 | warehouse1 | 100 |
| 1234 | warehouse2 | 150 |
| 1234 | warehouse3 | 100 |
| ⋮ | ⋮ | ⋮ |
| 9876 | warehouse1 | 200 |
| 9876 | warehouse3 | 100 |
| ⋮ | ⋮ | ⋮ |

Instance

Argument

Instance

Result Set

Inventory Cache Table 600

FIG. 6

```xml
<?xml version="1.0"?>
<CACHETABLERESULTSET>
    <HEADER>
        <CACHEINFO>
          <Date>Fri, 15 Mar 2002 17:37:42 GMT</Date>
          <Last-Modified>Fri, 15 Mar 2002 14:00:15 GMT</Last-Modified>
          <Time-To-Live>10000</Time-To-Live>
        </CACHEINFO>
        <TDPNAME>
          EmpInfo
        </TDPNAME>
        <ARGUMENT>
          <EMPNO>7369</EMPNO>
        </ARGUMENT>
        <SCHEMA>
            <COL name="EMPNO" type="NUMBER" precision="4" scale="0"/>
            <COL name="ENAME" type="VARCHAR" precision="10"/>
            <!-- additional columns follow -->
            <CONSTRAINT name=..........
        </SCHEMA>
    </HEADER>

<BODY>
        <ROWSET format="XML", action = replace>
          <ROW>
             <EMPNO>7369</EMPNO>
             <ENAME>Yev</ENAME>
          <JOB>ENGINEER</JOB>
          <MGR>7370</MGR>
          <HIREDATE>02/21/2000 0:0:0</HIREDATE>
          <SAL>800</SAL>
             <DEPTNO>20</DEPTNO>
          </ROW>
          <ROW>
             <EMPNO>7370</EMPNO>
             <ENAME>Ravi</ENAME>
          <JOB>MANAGER</JOB>
          <MGR>7902</MGR>
          <HIREDATE>12/17/1997 0:0:0</HIREDATE>
          <SAL>800</SAL>
             <DEPTNO>20</DEPTNO>
          </ROW>
          <ROW>
             <EMPNO>7371</EMPNO>
             <ENAME>Smith</ENAME>
          <JOB>CLERK</JOB>
          <MGR>7902</MGR>
          <HIREDATE>12/17/1980 0:0:0</HIREDATE>
          <SAL>800</SAL>
             <DEPTNO>20</DEPTNO>
          </ROW>
        </ROWSET>
    </BODY>
</CACHETABLERESULT>
```

Response Document 702

FIG. 7A

```xml
<?xml version="1.0"?>
<CACHETABLERESULT>
    <HEADER>
        <CACHEINFO>
            <Date>Fri, 15 Mar 2002 17:37:42 GMT</Date>
            <Last-Modified>Fri, 15 Mar 2002 14:00:15 GMT</Last-Modified>
            <Time-To-Live>10000</Time-To-Live>
        </CACHEINFO>
    </HEADER>
    <ROWSET format="CSV">
    <[CDATA[
        '7369','Yev','ENGINEER','7370','02/21/20000:0:0','800','20'
        '7370','Ravi','MANAGER','7902','12/17/19970:0:0','800','20'
        '7371','Smith','CLERK','7902','12/17/19800:0:0','800','20']]>
    </ROWSET>
</CACHETABLERESULT>
```

Response Document 704

FIG. 7B

```
xmlns:x=http://www.oracle.com/OracleLite
<x:CACHETABLEREQUEST op="select" TDP="TDP-name">
<!-- Handle multiple instances -->
   <x:INSTANCE>
      <x:ARG>
         <arg-1-name> arg-1-value </arg-1-name>
         ...
         <arg-n-name> arg-n-value </arg-n-name>
      </x:ARG>
   </x:INSTANCE>
   ...
   <x:INSTANCE>
      <x:ARG>
         <arg-1-name> arg-1-value </arg-1-name>
         ...
         <arg-n-name> arg-n-value </arg-n-name>
      </x:ARG>
   </x:INSTANCE>
</x:CACHETABLEREQUEST>
```

Select Request Document 800

FIG. 8

```
<CACHEREQUEST op="insert", TDP="TDP-name">
<!-- Handle multiple instances -->
    <INSTANCE>
       <x:ARG>
          <arg-1-name> arg-1-value </arg-1-name>
          ...
          <arg-n-name> arg-n-value </arg-n-name>
       </x:ARG>

<ROWSET>
       <!-- set of rows -->
       <!-- same as in response specification -->
          <ROW>
          ............
       </ROWSET>
    </INSTANCE>
...............
</CACHEREQUEST>
```

Insert Request Document 900

FIG. 9

```
<CACHEREQUEST op="delete", TDP="TDP-name">
<!-- Handle multiple instances -->
<INSTANCE>
   <x:ARG>
       <arg-1-name> arg-1-value </arg-1-name>
       ...
       <arg-n-name> arg-n-value </arg-n-name>
   </x:ARG>
   <ROWSET>
    <!-- set of rows -->
    <!-- same as in response specification -->
    <ROW>
    ............
   </ROWSET>
</INSTANCE>
...............
</CACHEREQUEST>
```

Delete Request Document 1000

FIG. 10

```
<CACHEREQUEST op="update", TDP="InventoryTDP">
<!-- Handle multiple instances -->
  <INSTANCE>
   <ARG>
     <PART#>P123</PART#>
   </ARG>
   <ROWSET>
      <ROW>
         <!-- Specify the old values in the where clause -->
         <WHERE>
            <WAREHOUSE>W234</WAREHOUSE>
            <QTY>1000</QTY>
         </WHERE>
         <!-- Specify the values to be updated -->
         <QTY>900</QTY>
      </ROW>
      <ROW>
         ............
   </ROWSET>
  </INSTANCE>
  ...............
</CACHEREQUEST>
```

Update Request Document 1100

FIG. 11

INTELLIGENT CLIENT AGENT FOR A HYBRID ONLINE/OFFLINE APPLICATION

BACKGROUND

This invention relates generally to the field of computer systems. More particularly, an intelligent client agent is provided for facilitating operation of a client application that operates in a hybrid offline/online mode.

Applications operated on mobile devices (e.g., laptop computers, personal digital assistants, mobile telephones) have generally been designed for either online or offline use. Both types of mobile applications tend to use some form of browser to interact with a user. Online applications enjoy continual access to an enterprise server (e.g., central database server). Offline applications, in contrast, operate with minimal or no contact with an enterprise server.

More specifically, an online mobile application can access data on the enterprise server whenever needed, thereby possibly obviating any need to store data locally. However, because of the "always connected" nature of an online mobile application, connection costs (e.g., for wireless air time) can be quite high.

Also, an online mobile application generally suffers from unpredictable latency. When the online application transmits a request to the server, the response time depends upon the level of usage of the mobile device's wireless network in addition to any congestion at the server. Further, usage of the online application may be geographically limited, depending on the extent of the wireless network, and may be prohibited in some locations (e.g., airplanes, hospitals).

Yet further, online mobile applications often access data in sets, such as entire web pages, data tables, etc. When a data item needs to be replaced, the entire dataset may be replaced rather than just the one item. This can be inefficient and increase the cost of operating the application.

One reason mobile applications tend to access data in sets (e.g., entire web pages), is that the data are tightly coupled to the presentation of the data. In particular, when data are copied or downloaded to a client device for a mobile application, each collection of data (e.g., a table, a set of database rows or fields) is typically conveyed within the page in which it will be displayed. Thus, the data cannot be displayed on the client except in that page. Because each set or collection of data may be stored with a full display page, and many pages may be identical except for their encapsulated data, much storage on the client may be wasted.

In contrast to an online application, an offline mobile application does not enjoy continual access to data maintained by the enterprise server. Some data (e.g., a snapshot) from an enterprise server may be copied onto or replicated on a mobile device. Although the offline application may always be usable (e.g., when offline from the enterprise server), it will not always have fresh data, and it can only access data that were copied to it.

An offline mobile application configured to use data snapshots is usually required to synchronize its stored, offline data with an enterprise server on an occasional or periodic basis (e.g., once per day). The frequency of synchronization is generally unrelated to the frequency with which data items are accessed or modified on the mobile device. Thus, many transactions or operations may be performed on the mobile device using stale data. And, synchronization may entail high overhead, as a large amount of data will often be exchanged—even data that have not changed and do not need to be refreshed. For example, an entire web page or set of web pages may be downloaded or exchanged even though only one data item in a page needs to be updated.

Because of the infrequent rate of data synchronization, offline mobile applications are not suitable for use with data that are highly dynamic. In addition, an offline mobile application is often required to maintain a transaction log of all data changes made by the application, in order to facilitate synchronization.

In general, enterprise data stored on a mobile device, for use with a mobile application, may have varying longevity. Some data points or items may be valid for long periods of time (e.g., a product description, an address); other data points or items may be invalid after only a relatively short period of time (e.g., a stock quote, a currency conversion rate). Existing mobile applications and client databases typically are not configured to recognize or consider the longevity of downloaded data.

Further, mobile client applications that attempt to provide significant functionality to users tend to require robust software and/or hardware configurations (e.g., a Java Virtual Machine, an HTTP listener, a servlet engine). Such requirements prevent the use of smaller, more restrained client devices, such as Personal Digital Assistants (PDA) or smart telephones, and also add overhead to client operations.

SUMMARY

In one embodiment of the invention, an intelligent client agent and a method for using the client agent to operate a hybrid online/offline client application are provided. In this embodiment, a client agent comprises a dispatcher for receiving and responding to page requests from a client browser, a cache for storing presentation formats of pages and other dependent data of the application, a database for storing data to be presented through the pages, a script engine for assembling a page to be presented graphically, and a voice engine to interpret the voice tags in the scripting language. Instead of storing each application page as a static composition, the presentation format of the page is stored separate from its content (e.g., data). At the time of assembly of a page by the script engine, the desired content is retrieved and bound to the presentation format.

In another embodiment of the invention, a client agent may also include a requestor for requesting data and/or a presentation format of a page from a remote computing device (e.g., a data server, a web server). The client agent may also include a queue for storing a request directed to a remote computing device until a connection to the device is available.

In another embodiment of the invention, a client agent may include a listener configured to receive an application, an application page, a presentation format of a page, data, or other communication from a remote computing device. In this embodiment, the remote device pushes the communication to the client, perhaps to update a set of data or application.

In yet another embodiment of the invention, a client agent receives a page request from a client browser and determines whether a presentation format for the requested page is cached or stored on the client. If not, the request may be passed to a requestor for a remote device. Otherwise, the script engine retrieves the presentation format and processes it. In doing so, the script engine may execute an SQL query against the client database to obtain data satisfying the request, bind the data to a variable in the presentation format, execute voice commands, and return the assembled page. The assembled page may be presented graphically.

In one alternative embodiment of the invention, a client agent operates in conjunction with a cache table, which may be part of a client database. In this embodiment, the cache table stores data obtained from a remote device (e.g., a data server), and associated cache control information indicates whether and/or how long the data are valid. When data within a cache table are needed (e.g., to assemble a requested page) and one or more of the requested data items are invalid, the cache table may be refreshed by establishing a connection with the remote device and downloading the necessary data items.

DESCRIPTION OF THE FIGURES

FIG. 6 depicts a cache table, according to one embodiment of the invention.

FIGS. 7-11 demonstrate illustrative formats for communications between a client device operating a cache table and a data source associated with the cache table, according to one embodiment of the invention.

DETAILED DESCRIPTION

Figure 1:
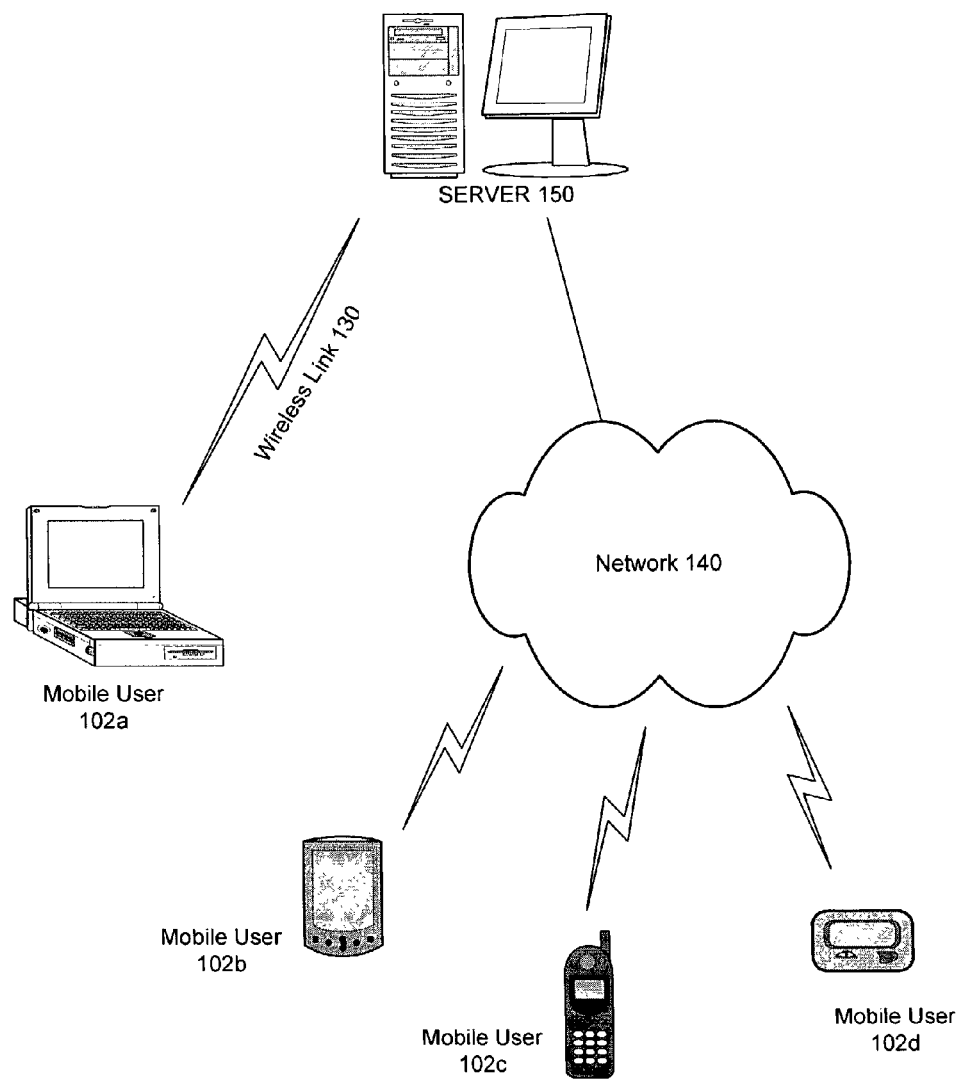
FIG. 1 is a block diagram depicting a mobile computing environment suitable for implementation of an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a mobile computer, a PDA (Personal Digital Assistant), a telephone, etc. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory or similar devices.

Introduction

In one embodiment of the invention, a system and method are provided for fine-grained caching, on a mobile device, of data used by an application executing on the device. In this embodiment, application data are stored in a database (e.g., a DBMS) comprising one or more cache tables configured to monitor the validity and/or usability of cached data.

In this embodiment, a cache table not only caches one or more data rows, but also stores, or is associated with, cache control information that describes the validity of the data, where or how to get a fresh copy of the data, etc. When an application accesses the cache table, the local DBMS inspects the desired data and, if still valid, serves it. If the cached data are no longer valid, the local DBMS requests updated data from the server if a connection to the server is available. Instead of retrieving a large set of data in order to update a single (invalid) data row, just that row may be retrieved.

In an embodiment of the invention, a cache table is a database table of data that can be retrieved on demand from a data source (e.g., enterprise server, database server, web server, application server), and stored in a local (e.g., mobile) device. Communications between the server and the device may employ any suitable protocol, such as HTTP (Hyper Text Transport Protocol), SOAP (Simple Object Access Protocol), WAP (Wireless Access Protocol), etc. A server hosting a data source may be configured to execute CGI (Common Gateway Interface) programs, servlets, applets, Java methods or other modules to implement interfaces associated with cache table specifications described herein.

In one embodiment of the invention, a cache table is compatible with a database programming model, so that a mobile application can access the cached data through a standard interface, such as ODBC (Open Data Base Connectivity) or JDBC (Java Data Base Connectivity). A mobile application that uses a local database of cache tables can therefore be written using a normal database model and interface. The database, through its cache table(s), manages data validity, retrieves updates for invalid data, and so on. The data and transactional semantics of cache table may be designed to follow industry standard transactional semantics.

Because the mobile device may not always be actively communicating with an enterprise server (or other central/master data source), and because data retrievals can be limited to just those data items that are invalid, connection costs can be kept relatively low. And, because of the limited number of accesses that must be made to the enterprise server, there is less of a problem with erratic performance resulting from unpredictable latency.

In another embodiment of the invention, an intelligent client agent is provided for enhancing operation of an offline application executed on a mobile computing device (e.g., a Personal Digital Assistant (PDA), a laptop or notebook computer, a smart telephone). In this embodiment, the client agent enhances the operation of the offline application by selectively enabling online access and separating application content from the presentation format of the content. Content and presentation may be separated by storing the data separately (e.g., in a cache table, snapshot or regular database table) from the presentation description or format of an application page. When an offline application needs a page, the client agent reconstructs the application page from the presentation description and data stored in the local database. The client agent may go online to retrieve volatile data and/or data that are stale; the client agent may also facilitate synchronization of a client snapshot with a server. Further, a client agent may enable a server to push information to a client cache table or database (e.g., using a push listener), and may also support voice-based interaction with a client application.

FIG. 1 depicts an illustrative mobile computing/communication environment in which an embodiment of the invention may be implemented. In this embodiment, enterprise server 150 is accessible through a direct wireless link 130 and/or network 140, which may comprise the Internet. Users of mobile devices 102a-102d therefore access server 150 directly or though a series of communication links. A user's mobile device may be a laptop or other portable computer, a PDA, a telephone, a two-way pager or other device.

In one embodiment of the invention, a client database or DBMS may include one or more snapshots of server data in addition to any cache tables. In this embodiment, a cache table stores data that may have originated anywhere (e.g., the client, any remote server or other system), along with information regarding the validity of the data. A snapshot stores data from a server or other source that is explicitly synchronized with the server. Illustratively, snapshot data may always be available when offline, while cache table may or may not be usable offline, depending on the validity of the data. Finally, regular database tables may be used store data generated by, and/or only used by, the client.

Cache Table Concepts

Figure 2:
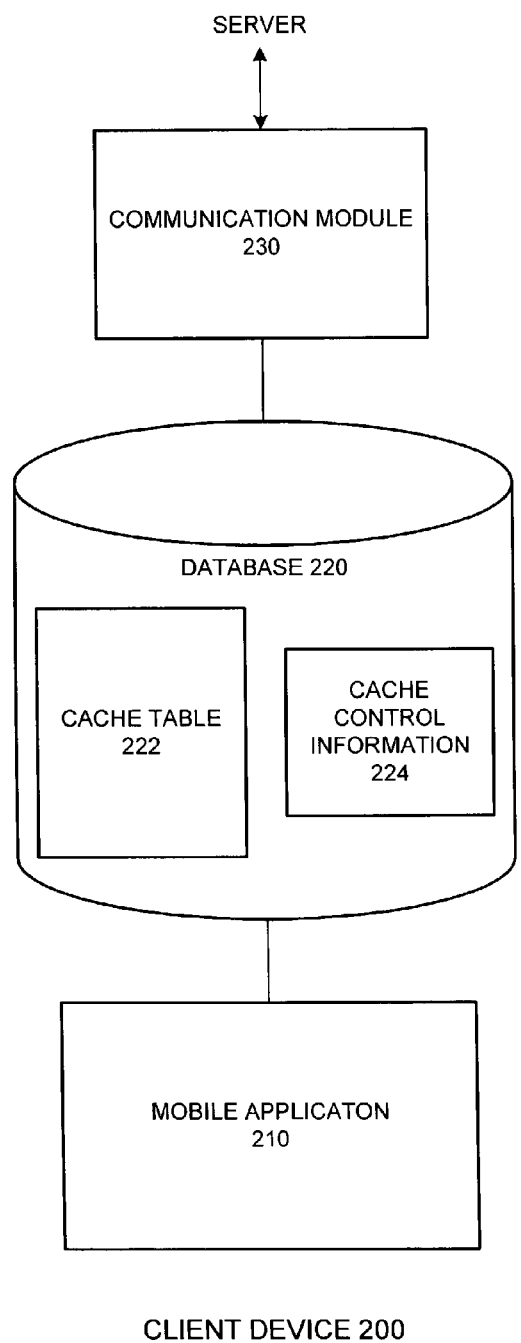
FIG. 2 is a block diagram of a client device configured to cache data on a mobile computing device, in accordance with an embodiment of the invention.

FIG. 2 is a block diagram of a mobile client device suitable for implementation with an embodiment of the invention. Device 200 comprises mobile application 210, database 220 and communication module 230.

Mobile application 210 is an application that uses or draws upon data stored in database 220. Database 220 may be configured to store any type of data (e.g., textual, numerical, graphical, video) for use by application 210. Database 220 includes one or more cache tables for caching the data, such as cache table 222. Database 220 also includes associated cache control information 224. Further details regarding cache tables and cache control information are provided below.

Communication module 230 is configured to access a server or data source that stores current or master versions of data cached in database 220. Thus, as described below, database 220 may periodically access the server, through communication module 230, in order to download new data, fresh data, updates to cached data, etc. Communication module 230 may be directly operated by the database, or the database may access the communication module through application 210, an operating system or other entity. Thus, communication module 230 may be coupled to mobile application 210 in addition to, or instead of, database 220.

In embodiments of the invention described herein, database 220 is a DBMS (Database Management System) product offered by Oracle® Corporation, such as Oracle 9i Lite.

In an embodiment of the invention, a cache table can be characterized by a four-tuple in the form <S, C, O, P>. In this form, S defines the schema or structure of the cache table, C defines constraints placed on the cache table, O represents a set of supported operations, and P represents a set of protocols for retrieving or updating cache table content (e.g., when the mobile device is connected or intermittently connected to a data source).

Cache Table Schema

In one embodiment of the invention, the schema, S, of a cache table is defined by three things: the name of the cache table, a list of column definitions describing the structure of the cache table, and a list of access parameters. A cache table name may adhere to table-naming conventions of SQL (Structured Query Language) databases.

A column definition comprises an identifier and an associated data type. Each identifier corresponds to a column name of the cache table, and may follow a column-naming convention. The access parameter list is an ordered list of a subset of the column identifiers of the cache table.

Because the cache table schema, S, describes the structure of a cache table, it also defines the structure of each instance of the cache table. In this embodiment of the invention, a cache table instance comprises all rows of the cache table that have identical values for the access parameter column(s) of the access parameters. An argument comprises a list of values—one for each access parameter of the cache table. Thus, an instance is a set of rows of the cache table with the same argument.

The result set of a cache table instance comprises a set of rows of the instance, each row comprising a list of columns that are not in the access parameters. That is, a result set is a projection of a cache table instance on the non-access parameter columns of the cache table. A specific instance of a cache table may be indicated by the name of the cache table followed by the corresponding argument value.

FIG. 6 depicts an illustrative cache table, according to one embodiment of the invention. Inventory cache table 600 includes three columns: Part# 602, Warehouse# 604 and Quantity on Hand (QOH) 606. In this cache table, the access parameter comprises just Part# 602. Thus, two arguments are shown: the values 1234 and 9876.

Based on the two arguments, two instances of the Inventory cache table are shown. One instance comprises three rows having the Part#1234, and the other comprises two rows having the Part#9876. The columns of cache table 600 that are not part of the access parameter form the result sets for the two instances.

In this embodiment of the invention, an illustrative cache table may be defined according to the following SQL (Structured Query Language) syntax:

<create cache table>::=
CREATE CACHE TABLE <table name>(<column list>
[, <constraint>]
[, ACCESS PARAMETERS (<access parameter list>)])
USING <content spec>
where
<access parameter list>::=
<access parameter name>[{, <access parameter>} . . . ]

Using this illustrative SQL syntax, a sample cache table may be defined as follows:
CREATE CACHE TABLE Inventory
(part# char(4), warehouse char(8), qty number(10),
PRIMARY KEY (part#, warehouse),
ACCESS PARAMETERS (patt#))
USING InventoryTDP TYPE updateable AT MyCompanyDS;

The schema, S, of the illustrated cache table is "Inventory (part# char(4), warehouse char(8), qty number (10))." One access parameter is specified: part#. The result set for the cache table comprises a set of rows, each of which contains two columns: a warehouse identifier and the quantity of the specified part that is stored in the warehouse. Following subsections describe portions of this sample cache table definition in further detail.

In general, the schema for a cache table T may be written as $T(a_1, \ldots, a_m, r_1, \ldots, r_n)$, where T is the cache table name, $a_1, \ldots, a_m$ is the list of access parameters and $r_1, \ldots, r_n$ are the cache table result set columns. Thus, the sample cache table may be represented as:

Inventory(part#, warehouse, qty)

An instance of a cache table may be written as $T(v_1, \ldots, v_m)$, where $v_1$ is a value for access parameter $a_1$. In this instance, the tuple $<v_1, \ldots, v_m>$ constitutes the argument of a specific cache table instance, and each row of the corresponding result set is of the form $<r_1, \ldots, r_n>$. Each row of a result set may be considered a separate result. The term "cache table" may be used herein to refer to a cache table having a particular structure (schema), or an instance of that cache table.

A set of instances of a cache table may be termed an "extension" of the cache table. An extension of a cache table is defined to include all instances of the cache table that are stored in the local database or DBMS. The extension of a cache table T may be written as E(T).

For a cache table, two predicates are defined with relation to each row of its extension: isValid and isUsable. As described further below, the isValid predicate may be used to determine whether a row is valid (e.g., at the time of a query execution), while isUsable may be used to determine whether the row is usable. Illustratively, if a row is valid, then it is usable, but if it is invalid, it may or may not be usable.

In one embodiment of the invention, a cache table may be used in multiple ways in an SQL statement. A reference to the cache table name alone (e.g., Inventory) is interpreted as a reference to the extension of the cache table. Thus, the SQL statement "Select * from Inventory" will return all rows of all result sets of all instances of the cache table Inventory that are currently stored in the local database. The local DBMS may not check for validity of usability of the rows nor make any attempt to refresh cache table instances. Illustratively, this type of reference may be limited to queries, and may not be usable for updates. It may be considered a "dirty read" of the cache table.

A reference to a cache table that includes a full set of argument values (e.g., constants) for an access parameter will return one instance of the cache table. Thus, the statement Select * from Inventory('P123')

will return a table of "part#", "warehouse" and "qty" data for part number 'P123.' With this type of reference, the local DBMS will use the flowchart shown in FIGS. 3A and 3B (described below) to refresh the instance if needed.

Another reference to a cache table, within an SQL statement, may include at least one variable within the argument. If the reference (e.g., in a query) is valid (i.e., a value can be bound to the variable), this type of reference returns one or more instances of the cache table. Thus, the statement Select p#, part Name, warehouse, qty From part P, Inventory(P.p#)

can be used to obtain result sets of inventory for part numbers in the part table. If no values can be bound to the variable, the query is considered invalid. With this type of reference, the local DBMS will use the flowchart shown in FIGS. 3A and 3B to refresh the instances if needed.

The preceding example demonstrates how a cache table access parameter can be bound to a column or expression of another table, including a result set of another cache table. Illustratively, a fully qualified column specification of a cache table column may use an alias for the cache table name, as in the following:

SELECT P.p#, P.pname, Inv.qty
FROM P, Inventory(P.p#) Inv
WHERE Inv.qty>100

Constraints

In an embodiment of the invention, constraints may be defined on any cache table extension (i.e., set of cache table instances). Thus, the column list of a cache table can be used to define constraints on the cache table. For example, primary and foreign key constraints may be defined in the definitions of columns of the cache table (e.g., if they are single attribute keys), or may be defined in a Primary Key or Foreign Key clause in the constraints portion of the cache table definition.

The sample Inventory cache table defined above includes one constraint, a primary key consisting of part# and warehouse. This means that, for a given part#, the result set may contain many rows or results, but no two rows in the result set will have the same warehouse value.

When defining the constraints, C, of a cache table, there are several options. For example, a single primary key may be defined as a combination of all of the access parameters or as a combination of all of the access parameters and some of the result set identifiers. Illustratively, if access parameter 'part#' of the Inventory cache table was defined as a primary key for the cache table, then the data returned for a particular value of 'part#' could contain, at most, a single row. In contrast, if a primary key was defined as a combination of 'part#' and 'warehouse,' then multiple rows could be returned for a given value of 'part#,' but the values for 'warehouse' would be unique for each value of 'part#."

For every cache table in one embodiment of the invention, a non-null system constraint is automatically defined for each access parameter. Additional constraints may be defined on an extension of the cache table. The DBMS will perform data integrity checks based on these constraints whenever a result set is received from a data source and instances are constructed from them. Integrity constraints may also be used to optimize storage of a cache table. For example, and as stated above, if a primary key is defined on any (or all) of the access parameters of a cache table, then each result set will contain at most one row for an argument, and the extension of the cache table may be stored in one physical table.

Conceptually, a constraint on a cache table T is a constraint defined on E(T). In an embodiment of the invention, if a primary key is defined on any (or all) of the access parameters of a cache table, the DBMS may store E(T) in a single physical table. All constraints defined on that cache table may be considered constraints on E(T).

Illustratively, refreshing a cache table instance includes retrieving the result set of the instance from the corresponding TDP (Table Data Processor—described below) of a data source, creating a row from the argument for each result, and inserting the row in E(T). Constraint checking may be conducted in a normal manner for insert, delete and update operations on E(T).

When a cache table has a foreign key referring to a primary key that comprises an entire argument of another cache table, the DBMS may check the foreign key constraint by opening a cursor on the instance of the second cache table. If the instance exists, and is valid or locked, then the constraint is deemed satisfied. If the instance does not exist, or is invalid, then the DBMS will try to retrieve or refresh the result set from the data source. If the data source returns a result, it is cached and the constraint is deemed satisfied. If there is no connection to the data source, an error is reported.

Operations

In an embodiment of the invention, the operations, O, that are supported for a cache table may be defined in a "Using" clause of the cache table definition. Illustratively, a Using clause may specify: the name of a data source, the name of a table data processor (TDP), and the type of the TDP.

Implementations of cache table operations reside on a server or other location that hosts a data source and is regularly accessible to the mobile application. The implementations are invoked by the local DBMS when the corresponding operations are performed on a cache table. Alternatively, some operation implementations may reside on the mobile device.

In one embodiment of the invention, a Using clause portion of a cache table creation may employ the following SQL syntax:

USING <table data processor name>
TYPE {read-only|updateable|insertable|deletable}
AT <data source name>

In this embodiment of the invention, two types of TDPs are supported: read-only and modifiable. A modifiable TDP may be any combination of insertable, deletable, and updateable. An insertable TDP allows rows to be inserted into the cache table extension and implements the insert method that the local DBMS will call after rows have been inserted into the cache table instance. Similarly, a deletable TDP implements the delete method and allows rows to be deleted from the cache table, and an updatable TDP implements the update method and allows rows to be updated (e.g., to change column values). As stated above, a TDP models an operation that can be performed on a cache table.

Illustratively, a read-only TDP implements the "select" method only, which takes an argument (i.e., set of values for a cache table's access parameters) and returns a set of rows comprising a result set. A protocol that may be used is described in a following section.

In contrast, a modifiable TDP must implement "insert," "delete" and/or "update" methods, depending on the type of the TDP declared in the corresponding Using clause, as well as the "select" method. In an embodiment of the invention, when a client device or application attempts to update a cache table, the local database first determines whether the content is still valid (as described below). If valid, the contents are updated and the corresponding method on the TDP is invoked. If the method returns a failure, the update is rolled back to the point before the operation started. If the contents were invalid, the database sends a request (e.g., insert, delete, update) to the TDP and indicates that a new result set should be returned.

The "data source name" field refers to a data source that may be separate from the local database. A data source is configured to provide sufficient information to the local DBMS to enable the DBMS to understand the capabilities and protocol(s) of the source. A data source may also specify a period of validity and/or usability of a result set of a cache table instance. Illustratively, a data source may comprise a web server, an application server, a database server or other source.

A data source may implement one or more TDPs; each TDP provides one or more methods to facilitate operations, on the data source, on behalf of the cache table. In this embodiment of the invention, each TDP is responsible for supplying the result set of a cache table instance when called by the client DBMS. A TDP may implement logic to perform insertions, deletes, updates, and/or other operations.

In association with the sample cache table creation described above (cache table "Inventory"), a data source may be defined using the following extended SQL syntax:

<create data source>::=CREATE DATA SOURCE <data source name>
TYPE <type name> PROTOCOL <protocol name>
[<authentication>]
<destination>
where
<type name>::=local|basic|auth|database
<protocol name>::=omc|http|https|SOAP
<authentication>::={USING|USER} {CURRENT USER|<user name>} {IDENTIFIED BY|PASSWORD} <password>
<destination>::=AT <URI>

The "data source name" field will be unique within a database schema.

The data source TYPE field defines the capability of the data source (e.g., local, basic, auth, database).

Illustratively, a "local" data source may be a data server implemented on the client (mobile) device, and may be used to access a PIM (Personal Information Management) database, electronic mail, address book, etc. A local DBMS may preload a local data source for a given client device. In this embodiment, the protocol employed for a local data source (specified in the "protocol name" field above) is OMC (Oracle Mobile Client).

A "basic" data source is a simple data source that can accept http, a web service request, or a similar request. It is generally a session-less server, and may not authenticate a requestor or support transactions. Therefore, the <authentication> clause may be omitted for a basic data source.

In this embodiment, an "auth" data source is a data source that requires client authentication (e.g., the client must login and obtain a session object). The <authentication> clause for an auth data source provides a user name and password for logging into the source. A server that provides an auth data source will support login and logout methods, and the login method will return a session object.

A "database" data source is an authenticating data source that may support database operations such as "beginTransaction," "prepareToCommit," "commit" and "rollback." The data source may be transactional if the server hosts at least one TDP that supports cache table updates (e.g., insertion, deletion or update of rows in the cache table).

In connection with the cache table creation illustrated above, the data source MyCompanyDS that was identified in the Using clause of the cache table creation may be defined as follows:

CREATE DATA SOURCE MyCompanyDS
TYPE basic PROTOCOL http
AT 'MyCompany.com/DS';

Protocol

In an embodiment of the invention, the protocol(s) for communicating between a local DBMS and a data source or TDP are defined in part P of a cache table's four-tuple. In particular, P identifies one or more protocols (e.g., SOAP, HTTP, etc.), plus XML tags or other devices (e.g., HTML tags) used in a response from a data source or TDP.

The client DBMS may communicate with the data source using any one of the supported protocols. Regardless of the protocol used, in one embodiment of the invention the client DBMS may exchange any or all of the data items of TABLE 1 with the data source.

TABLE 1

| Operation | Send Data | Receive Data |
| --- | --- | --- |
| Login | User name, password | Session id |
| Logout | Session id | None |
| Begin transaction | Session id | Transaction id |
| Prepare to commit | Transaction id | OK or ABORT |
| Commit | Transaction id | OK |
| Rollback | Transaction id | OK |
| Select (multiple instances may be selected in a request) | An XML document (see FIG. 8 for an illustrative Select request document format) | An XML document (see FIG. 7 for an illustrative response document format) |

TABLE 1-continued

| Operation | Send Data | Receive Data |
| --- | --- | --- |
| Insert (multiple rows of a result set may be inserted for a single instance) | An XML document (see FIG. 9 for an illustrative Insert request document format) | An XML document (see FIG. 7 for an illustrative response document format) |
| Delete (multiple rows of the result set may be deleted for a single instance) | An XML document (see FIG. 10 for an illustrative Delete request document format) | An XML document (see FIG. 7 for an illustrative response document format) |
| Update (multiple rows of the result set may be updated for a single instance) | An XML document (see FIG. 11 for an illustrative Update request document format) | An XML document (see FIG. 7 for an illustrative response document format) |

If the protocol used is HTTP, the argument of a cache table instance may be sent in an XML document as part of the POST method. The result of the select method may be an XML (Extensible Markup Language) document containing a header and a body. The header may contain cache control information, and the body may contain a set of rows that constitute the result set. Illustratively, the body may be encoded as an XML document according to the OMC Cache Table Result Set format, or it may be encoded as a more compact Oracle Lite CSV (Comma-Separated Values) file.

The insert and delete methods may accept an argument (i.e., set of access parameter values) and a list of column values representing a single row that the client wants to, or previously did, insert into the cache table. The update method may take the argument and a list of column values that represent a single old row, and another list that represents an update. All the data for all the methods are sent as an XML document with the HTTP POST method.

In one embodiment of the invention, the request format is an HTTP POST request and the URL used is that of the data source. The user agent string is "Oracle Lite". So for example, an HTTP request to obtain the instance of Inventory cache table for the argument 'p123' may be as follows:

POST http://MyCompany.com/DS \r\n content-length: . . . \r\n
    User-Agent: Oracle Lite \r\n . . .
    \r\n\r\n
    . . .
    <x:CACHETABLEREQUEST          op="select" TDP="InventoryTDP">
      <!--Handle multiple instances-->
        <x:INSTANCE>
          <x:ARG>
            <PART#>P123</PART#>
          </x:ARG>
        </x:INSTANCE>
    </x:CACHETABLEREQUEST>

A request header may contain some additional information such as If-Modified-Since.

The response to a request is an XML document that contains a header and a body. The format for the response is described in appendix B.

The response header in an embodiment of the invention may contain any or all of the following information:

Response Date—date of the response in an 3 HTTP formats (e.g., RFC1123) according to the data source clock;
Last-Modified—date when the data were last modified on the data source (also in HTTP date format);
Expires (or Expiration Date)—date until which the data should be considered valid;
Time-To-Live—how long the data can be considered valid, expressed in seconds;

Staleness—an integer number greater than zero that indicates whether and how long a stale (expired) result set can be used if there is no network connection to refresh the result set. A Staleness value of 1 is default and indicates that the stale result set cannot be used at all. If the staleness values is n, it indicates that the stale result set can be used for up to n times the Time-To-Live value.

As described in TABLE 1, FIGS. 7-11 demonstrate sample forms of XML documents that can be used for communicating between a client device and a data source.

FIGS. 7A-B demonstrate sample Response Document Format 702, 704. Each format includes a header and a body. The header may include a server identification, client identification, cache information (e.g., Date Last-Modified, Expires, Time-To-Live, Staleness), TDP name, an argument for a result set, the cache table schema, date format, etc. The body contains one or more row sets, each of which may identify the row set format, an action (e.g., replace, insert, delete, update), a separator character, etc. The body of response format 702 is in XML format, while the body of response format 704 is in CSV format.

FIG. 8 demonstrates sample Select Request Document 800. FIG. 9 demonstrates sample Insert Request Document 900. FIG. 10 demonstrates sample Delete Request Document 1000. FIG. 11 demonstrates sample Update Request Document 1100.

Cache Table Operation

As described above, in one embodiment of the invention, when a client application issues an operation (e.g., a query) involving a cache table, the local database or DBMS determines whether the instance for the cache table with the given set of access parameters is already cached and is still valid. If so, the cached result set may be used for the operation. Otherwise, as just illustrated above, the database will call the select method on the TDP defined for the cache table in order to retrieve the result set. A response from a TDP may include a header containing any or all of the cache control parameters mentioned in the previous section.

Figure 3A:
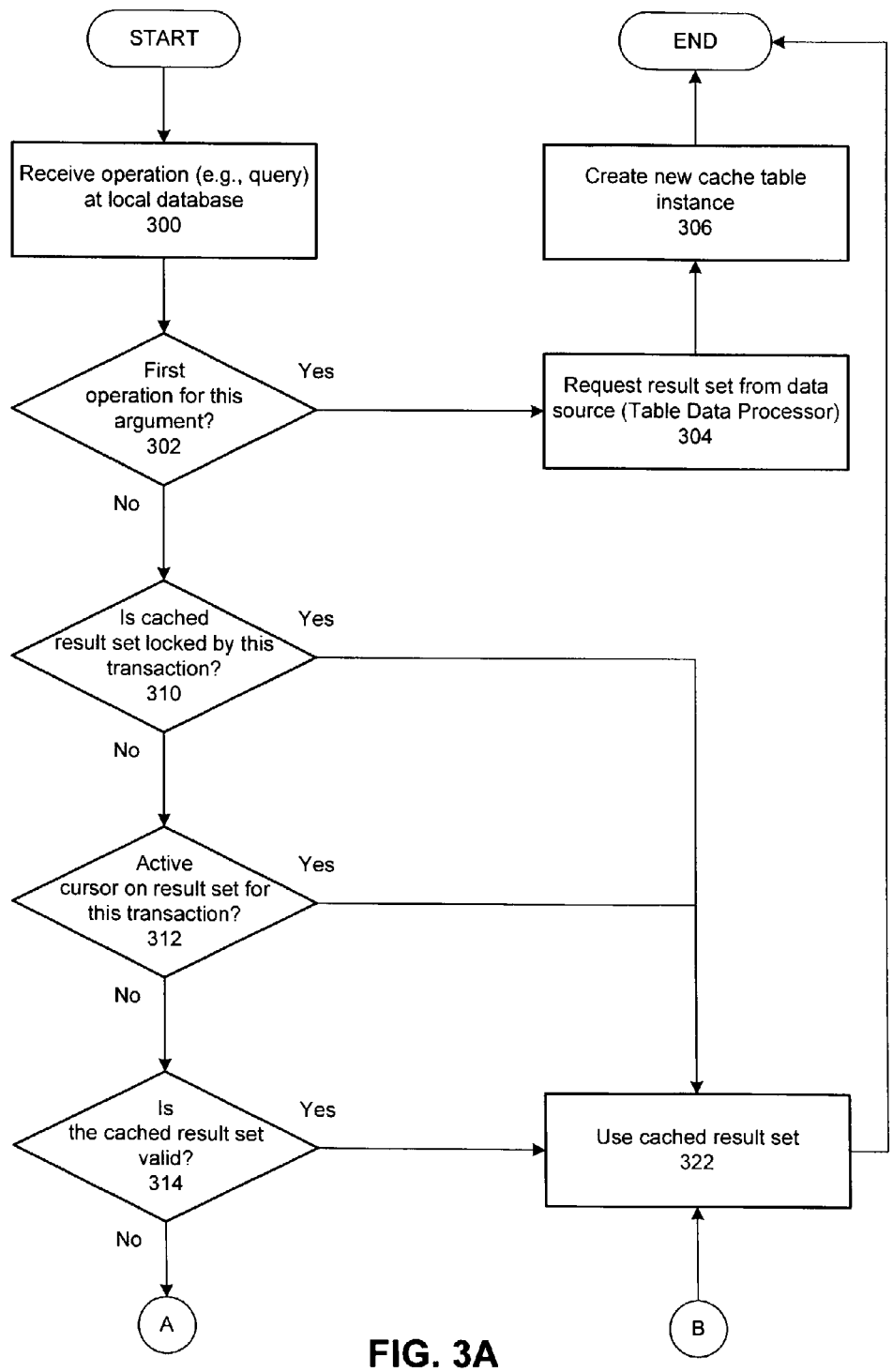
FIGS. 3A-B comprise a flowchart illustrating one method of using and refreshing a cache table in accordance with an embodiment of the invention.
Figure 3B:
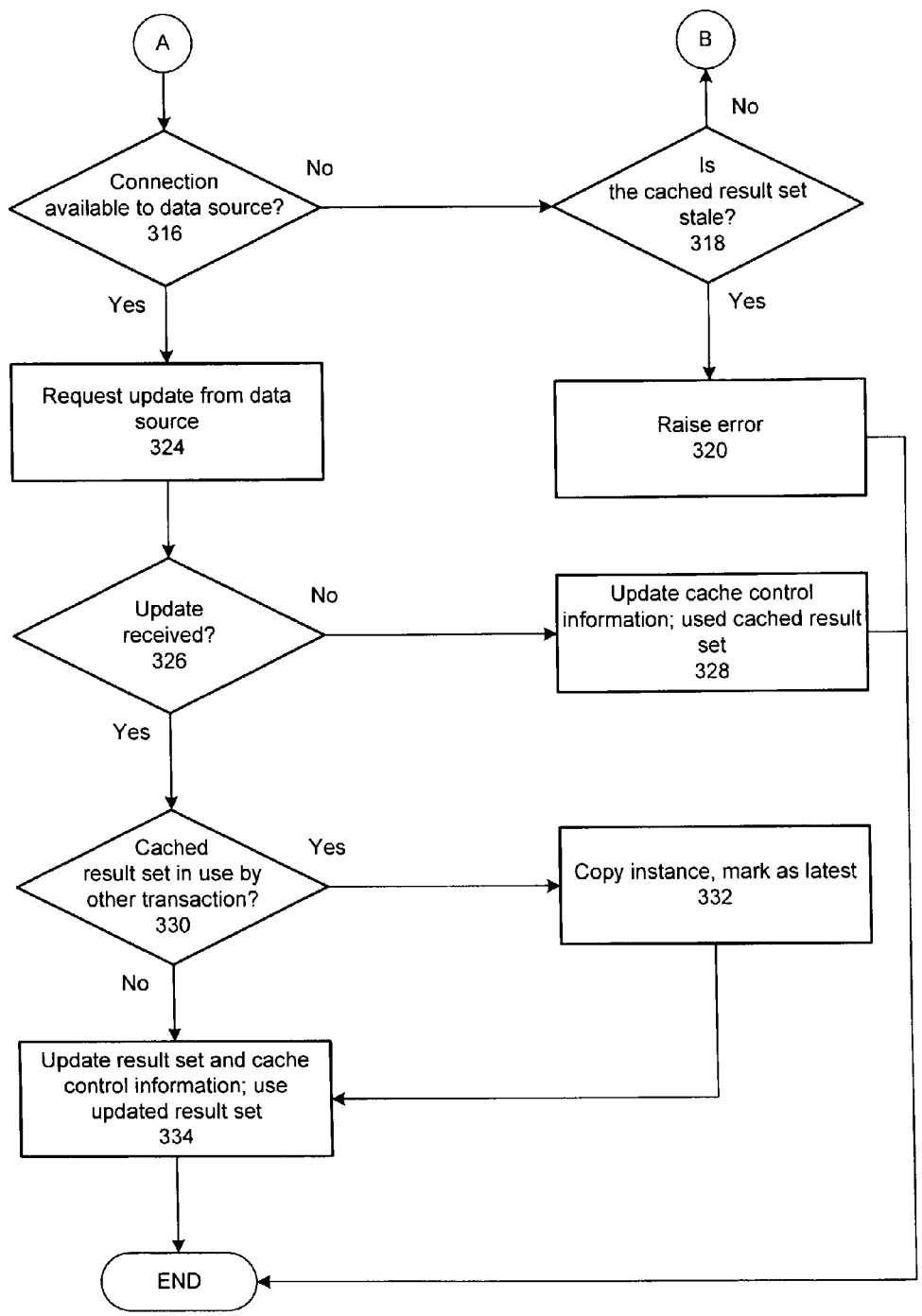

FIGS. 3A-B comprise a flowchart demonstrating an algorithm for determining whether to update, retrieve or refresh a cache table instance, according to one embodiment of the invention. In this algorithm, Current Date refers to the current date/time on the client machine.

In the algorithm of FIGS. 3A-B, a cached instance of a cache table may be considered "valid" if it is used before its expiration (e.g., as defined by the Time-To-Live or Expiration Date parameter). The instance may be considered "usable" by a transaction if (1) it is "valid", (2) it is locked by the transaction, or (3) if it has expired but is being used (because a communication link to the data source is unavailable) before it is stale (as computed from the Staleness parameter). More formally:

Usable=valid OR locked OR (no connection to data source AND (Response Date+(Time-To-Live*Staleness)>=Current Date))

In state 300, an operation (e.g., a query) is received by the local database or DBMS (Database Management System). The operation concerns one or more cache table instances the database is configured to store.

In state 302, the DBMS determines whether this is the first operation involving the argument provided as part of the operation. More generally, the DBMS may determine whether it has a result set corresponding to the argument, regardless of whether the result set is valid, usable, stale, or in some other condition. If this is the first operation for this argument (e.g., the database contains no result set associated with the argument), the illustrated method continues at state 304; otherwise, the method advances to state 310.

In state 304, the DBMS issues a request to a data source, to be directed to the Table Data Processor associated with the cache table, for the result set corresponding to the argument.

In state 306, a new cache table instance is generated in the DBMS for the result set, and is used to satisfy the operation. Illustratively, caching headers may be stored on the client device. The method then ends. If the data source could not be contacted to obtain the result set (e.g., in state 304), an error may be signaled by the database.

In state 310, a previous result set pertaining to the argument was located in the cache table, and the DBMS determines whether it is presently locked by the current transaction. In this embodiment of the invention, if the transaction isolation level of the current transaction is "Repeatable Read" or "Serializable" (which would account for the result set being locked), the DBMS will not refresh the result set for the current transaction. If the current transaction has locked the result set, the illustrated method advances to state 316.

Otherwise, in state 312, the DBMS determines whether the current transaction has an active cursor on the cached result set. In this embodiment of the invention, if the transaction isolation level of the current transaction is "Read Committed" (which would account for the active cursor and no lock), the DBMS will not update the result set, so as to provide read consistency and cursor stability. If the current transaction has an active cursor open on the result set, the method advances to state 316.

Otherwise, in state 314, the DBMS determines whether the cached result set is valid. As specified above, the result set may be considered valid if a Time-To-Live parameter or Expiration Date for the result set has not yet been exceeded (e.g., Response Date+Time-To-Live>=Current Date). If the cached result set is not valid, the illustrated method continues at state 316; otherwise, the method advances to state 322.

In state 316, the DBMS determines whether a connection is available to a data source (e.g., TDP) associated with the cache table. If a connection is available, the method proceeds to state 324.

In state 318, no connection is available to the data source, and the cached result set is known to be invalid, so the database determines whether the result set is usable or stale. Illustratively, the result set may be considered stale if (Response Date+(Time-To-Live*Staleness)<Current Date). If the cached result set is not yet stale, then the method continues to state 322.

Otherwise, the cached result set is not valid and is stale, and there is no connection available to a data source that can refresh the cache table instance. Therefore, in state 320 the DBMS signals an error and the method ends.

In state 322, the existing result set in the DBMS is used to satisfy the current operation. The procedure then ends.

In state 324, the presently cached result set has been deemed invalid, but a connection is available to the data source, so a refresh operation is requested. Illustratively, a refresh request may include an If-Modified-Since header reflecting the Last Modified date of the previous refresh of the result set. If the Last Modified date value is not available from the last refresh or update, then Response Date may be used instead.

In state 326, the DBMS determines whether any updates are received in response to the request. Illustratively, if the TDP (via the data source) finds that the result set has not been updated since the last time it was provided to the local DBMS, then no updates will be sent. If any updates were received, the illustrated method proceeds to state 330.

Otherwise, no updates were received, and so in state 328 the cache control information is updated appropriately and the cached result set is used for the current operation. Illustratively, any cache control information received with the response will be used to update or overwrite existing cache control information. The method then ends.

In state 330, the DBMS determines whether the cached result set is currently in use by another transaction.

In state 332, the result set is in use, and so the DBMS copies it and marks the copy as the latest version of the result set. Copies other than the latest version may be marked to be deleted when the transactions using them are terminated.

Then, in state 334, the DBMS updates the result set according to the update(s) received from the data source, and uses the updated result set for the current operation. The illustrated method then ends.

In an embodiment of the invention in which synchronization of local and server (data source) clocks is a problem, a Local Date value may be computed and used in place of Response Date. Also, Response Date and Expiration Date may be used to compute the Time-To-Live value (if not included in a response).

Read-Only Cache Table

In one embodiment of the invention, when a query or other cache table operation refers to cache table T by name only (i.e., without an argument), a cursor is opened on E(T) (i.e., the extension of the cache table). The cursor iterates through the latest version of each instance within E(T), without regard to whether the instance is usable. The local DBMS will not attempt to refresh or lock an instance. An instance within E(T) may be refreshed, however, if some other transaction opens a cursor on it. It should be recalled that an update operation must provide an argument, and will therefore not refer to a cache table by name alone.

When a query refers to a specific cache table instance, such as $T(v_1, \ldots, v_m)$, where each $v_i$ is a constant, the DBMS will check whether the instance is usable. If so, a cursor is opened on it; if not, the DBMS will try to refresh it. If there is no connection available to the requisite data source, an error may be returned.

In an embodiment of the invention, if a transaction that issues a query against a cache is in "Read Committed" isolation level, and the query includes an argument, no lock will be applied to the affected cache table instance. If the transaction is in "Repeatable Read" isolation level, a read lock is applied to the instance. If the transaction is in "Serializable" isolation level, a read lock may be applied to the instance and E(T).

If a given transaction closes a cursor on a cache table and then reopens it, the refresh policy may depend on the transaction isolation level. Illustratively, if the transaction isolation level is Read Committed, then the cached content will be refreshed if the cache became unusable before the cursor was reopened. If the transaction level is either Repeatable Read or Serializable (a read lock is applied to the instance), the same content may be used for the reopened cursor, regardless of whether or not the content has expired.

For a cache table T, different instances may have differing periods of validity. For example, the period of validity of a cache table instance $T_1 (v_1, \ldots v_m)$ may be one hour, while the period of validity of cache table instance $T_2 (u_1, \ldots u_m)$ may be thirty minutes. In this example, $(v_1, \ldots, v_m)$ and $(u_1, \ldots, u_m)$ are arguments. Illustratively, the validity period of an instance is set by a data source from which the result set was obtained, and a client DBMS may not refresh cache table content that is still valid.

In an embodiment of the invention, the local DBMS makes a Closed World Assumption regarding the validity period of a result set, and will not refresh any cache table content (result set) if still valid. It also assumes that any content obtained from a data source during a refresh comprises data that have been committed at the source.

Updateable Cache Table

For an updateable cache table, in one embodiment of the invention only one transaction may update a cache table instance at a time. In this embodiment, a write lock is applied to an updateable cache table instance.

When a transaction updates an updateable cache table instance, the update is first applied to the result set if it is still valid or is already locked for this transaction. Then the corresponding update method of the TDP is invoked at the data source. Illustratively, the update fails if the method fails.

If no connection to the data source is available when a cache table instance is updated, an error is reported. And, if there is any error during application of an update, the DBMS will rollback the transaction at the data source.

An instance of a cache table T is a unit of read consistency for queries, stability of cursors and, in this embodiment, is the smallest object that can be locked for concurrency control of updateable cache tables. Formally, a cache table instance is a subset of E(T), wherein all rows in the subset have the same argument:

$$T(v_1,\ldots,v_m) \equiv \{x | x \in NE(T) \wedge x \cdot a_1 = v_1 \wedge \ldots \wedge x \cdot a_m = v_m\}$$

A cache table instance is valid in this embodiment if, and only if, the cursor opened on the instance is opened before the end of the time period marked by the sum of Response Date and Time-To-Live:

$$\text{IsValid}(T(v_1,\ldots,v_m)) \Leftrightarrow (\text{Response Date}$$
$$(T(v_1,\ldots,v_m)) + \text{Time-To-Live}(T(v_1,\ldots,v_m))) \geq \text{Current Date}$$

A result set of cache table instance is usable in this embodiment if, and only if, it is either (1) valid, (2) locked by a transaction for update, or (3) there is no connection available to the data source when a cursor is opened on the instance and the instance has not yet passed its Staleness limit:

$$\text{IsUsable}(T(v_1,\ldots,v_m)) \Leftrightarrow \text{isValid}(T(v_1,\ldots,v_m))$$

$$\vee \text{hasLock}(T(v_1,\ldots,v_m))$$

$$\vee (\neg \text{is Reachable}(\text{DataSource}(T)) \wedge (\text{Response Date}(T(v_1,\ldots,v_m)) + (\text{Time-to-Live}(T(v_1,\ldots,v_m))$$
$$*\text{Staleness}(T(v_1,\ldots,v_m)))) \geq \text{Current Date})$$

In an embodiment of the invention, whenever a cursor is positioned on a row of an instance, that instance cannot be modified. If another transaction attempts to open a cursor on the same instance, the local DBMS will retrieve the result set for that instance from the data source and create a new instance. The new instance becomes the latest version of the instance and all other versions will be purged when their cursors are moved.

An Intelligent Client Agent

In one embodiment of the invention, an intelligent client agent is provided to facilitate operation of an offline or mobile application on a mobile client device. More particularly, in this embodiment, a client agent enhances a mobile application with one or more features, such as: voice interaction with a user, pushing data from a server to the client, and selective online access to remote data (i.e., data stored elsewhere than on the client).

The client agent may also enable the separation of content to be presented to a user from the format in which the content is to be presented. Illustratively, the latter benefit allows the client to generate pages on the fly from a specified presentation format and one or more sets of data that can be displayed using the format. The pages may then be displayed by a suitable client browser.

For example, in an embodiment of the invention implemented for a mobile application involving access to inventory data, a client agent allows a presentation description or format for the data to be stored separate from the inventory data. Thus, the presentation format may be configured to present information such as a part name, description, price, quantity on hand, and so on, for a given part number. The data may be stored in a database, cache, cache table or other structure. When a user provides a particular part number, the corresponding data are retrieved and combined with the presentation format for display to the user.

Illustratively, a presentation format or presentation description page may be populated with variables, field names or other placeholders representing data or content items, as well as commands in a script language that can be used to control how the data in the local database can be used to replace the placeholders. A script engine of the intelligent client agent executes the script language in the page to replace the placeholders with actual values before the page is returned to the browser.

One skilled in the art will appreciate that previous mobile or offline applications were configured to store static, monolithic pages combining content with a presentation format. As a result, each set of content was stored as a separate page, thereby requiring greater storage capacity and providing less flexibility. For example, if just one data item in a stored page needed to be updated, the entire page containing that item had to be retrieved. And, if that one item was part of multiple pages, each of those pages had to be retrieved.

Implementing an intelligent client agent in a mobile client device along with a cache table facilitates development and use of a hybrid online/offline application that accesses data locally (e.g., offline) but which can also avail itself of online access to selected (e.g., highly volatile) data. A mobile application may also be operated fully offline, and submit data changes, completed forms and other information when placed back online. Yet further, content and applications may be dynamically downloaded, and may even be pushed to the client (e.g., a new travel itinerary, a change to a set of tasks).

In an embodiment of the invention, content stored on a mobile client device may be stored in accordance with a predetermined schema. According to the schema, the content may be stored in a database table, a snapshot of data server contents, a cache table or other structure. For example, storing data in a database table allows the client agent to easily and explicitly load and refresh the data. Storing data in a snapshot may facilitate the push of new/updated data to the client from a server (as described further below). Storing data in a cache table, as described in previous sections, allows the use of an intelligent refresh policy for the data as well as on-demand loading from virtually any source (e.g., a server). The schema may include or be associated with a URL (Uniform Resource Locator) indicating a location of data to be retrieved, loaded, updated, etc.

As mentioned above, besides separating content from the presentation format for that content, an embodiment of a client agent allows a user to interact with a mobile application using voice. In the above example, for instance, a user may speak a part number and the mobile application may respond by speaking the associated inventory data. This may be of particular value when the user is operating a vehicle or otherwise cannot divert his or her eyes or hands from another task. In this embodiment of a client agent, voice utilities or components of speech-to-text and text-to-speech converters (e.g., grammar checker, phonemes) may be installed as part of a client device's operating system or as part of the mobile application.

The process of configuring a client device for an embodiment of the invention may involve downloading to the device a set of application pages or modules, content or data for the application, schema page(s), utilities (e.g., voice application or utilities), a browser, etc. An application page designed to elicit data or content from a user, or provide data or content to a user, may be expressed as a presentation description or format (as described above). For a mobile application configured according to this embodiment of the invention, a download page may identify some or all of the application pages (presentation formats), voice files, schema pages, and so on. Loading or browsing the download page may automatically trigger the loading or retrieval of each component.

In an embodiment of the invention, a download page comprises a program written in a suitable script language. The program includes special tags or markers (e.g., "import," "schema") to identify items to be downloaded and actions to be taken. Thus, the download page is more than a mere list of pages or other content to be cached.

Figure 4:
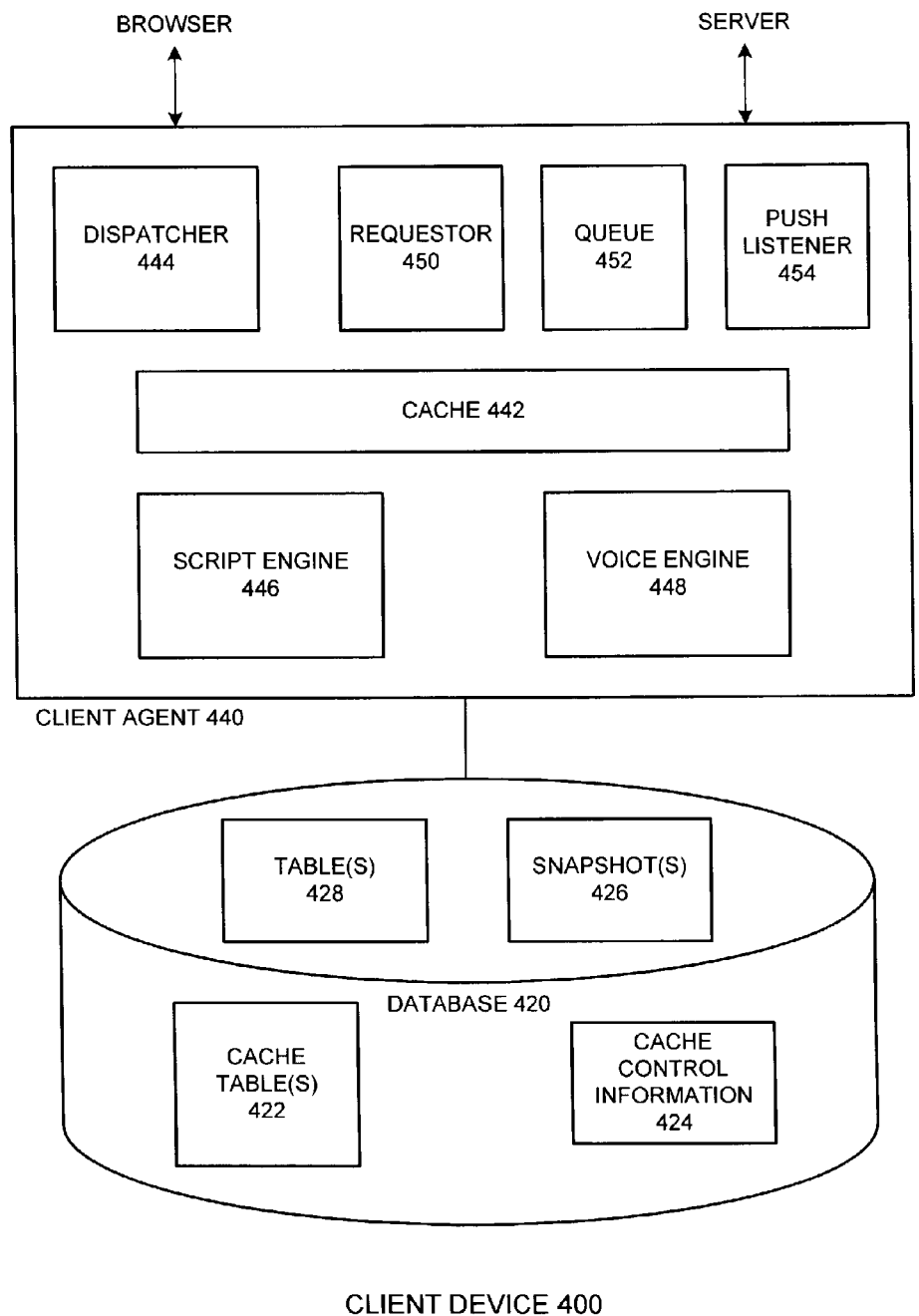
FIG. 4 depicts a mobile client device equipped with an intelligent client agent, in accordance with an embodiment of the invention.

FIG. 4 depicts a mobile client device equipped with an intelligent client agent, according to one embodiment of the invention. In this embodiment, client device 400 may be a PDA, a smart telephone, a handheld, laptop or notebook computer, or some other mobile computing device.

Client 400 includes database 420, client agent 440 and a browser. The client browser may be compatible with HTML (Hypertext Markup Language), XML (Extensible Markup language), or any other markup language now known or hereafter developed. The browser is configured with suitable protocol identification and handling as described below. Client agent 440 interacts with database 420 using ODBC (Open Database Connectivity), JDBC (Java Database Connectivity) or some other interface.

Although client agent 440 may frequently operate in an offline mode, it may also operate online when needed (e.g., as described below), at which time it may interface with one or more servers through a wireless (or wired) network. Client agent 440 may operate as described below for one or more embodiments of the invention without requiring a Java Virtual Machine (VM) on client 400.

Database 420 includes one or more cache tables 422, described in a previous section, and corresponding cache control information 424. The database may also comprise one or more snapshots 426 of data copied from a server, and data tables 428. Illustratively, database 420 may be Oracle 9i, 9iLite, or another DBMS offered by Oracle Corporation.

In one implementation of the illustrated embodiment of the invention, database tables such as table(s) 428 contain locally useful data that are not synchronized with a data server. Snapshot(s) 426 contain a subset of data (from the data server) that may be synchronized periodically with the data server. Cache table(s) 422 include data having specified periods of validity and may be refreshed as described in a previous section (e.g., when requested cache table content is stale).

Cache 442 of client agent 440 is configured to store presentation descriptions or formats of pages to be displayed by the browser. As described above, a presentation format may be populated with multiple different sets of content, as needed, thereby eliminating the need to store each assembled page. Cache 442 may also cache selected data from database 420.

Dispatcher 444 implements an interface defined by the browser to register itself as a protocol handler. The dispatcher receives page requests from the browser and passes assembled pages to the browser. In one embodiment of the invention, dispatcher 444 only receives page requests corresponding to one or more specified protocols. For example, the browser may be configured to send page requests for an Oracle Mobile Client (OMC) protocol to the dispatcher; such requests may comprise URLs in the form "omc://www.oracle.com." Illustratively, regular HTTP (Hypertext Transport Protocol) requests (e.g., "http://www.oracle.com") may be submitted by the dispatcher 444 to a server (e.g., through a wireless network). If a requested page is cached, dispatcher 444 will forward the assembled page to the browser; if the requested page is not cached, the request may be forwarded to a remote server. A request sent to a remote server may be handled by requestor 450 and/or processed through queue 452.

The dispatcher may, before serving a page to the browser, inspect information contained in the request and in the header of the page, such as the MIME (Multipurpose Internet Mail Extension) type of the page, and call an appropriate request handler. The request handler will perform the appropriate action, which may produce a valid page in a markup language supported by the browser, which may then be given to the browser by the dispatcher. Client agent 440 may be configured with a request handler for OTL (Offline Tag Library) pages, which use tags that may contain SQL (Structured Query Language) tags referring to database tables, snapshots and/or cache tables. In FIG. 4, script engine 446 may comprise a handler for OTL MIME type.

In the illustrated embodiment of the invention, script engine 446 performs assembly of pages that are to be presented to a user graphically via the browser (i.e., not via voice). When the script engine receives a request for a cached page (e.g., from dispatcher 444), it retrieves the page's presentation format (e.g., from cache 442) and the appropriate data (e.g., from database 420). The data are then bound to the corresponding variables or placeholders of the presentation format to produce an assembled page. The assembled page may then be returned to the dispatcher and passed to the client browser.

The script engine 446 is configured to work with voice engine 448. When the script engine encounters a voice tag such as <say . . . > or <prompt . . . >, it prepares the arguments to the appropriate method of the voice engine and calls the method. The voice engine then responds aurally to the method call and returns the control and the result of the method call to the script engine.

Page requestor 450 may handle interaction with a remote system (e.g., a data server) to retrieve a requested page (e.g., a presentation format) and/or content that is not stored locally or that is stored locally but is stale. Queue 452 may store requests and/or other communications to be exchanged with remote systems.

Push listener 454 may be configured to listen for pushed content, pages (e.g., presentation formats), download pages, application pages, and/or other items. Pushes may be received as SMS (Short Message Service) communications or in some other format recognizable to client 400. As just one example of a push, a data server may push an SMS message containing a series of SQL statements. Push listener 454 may execute the statements or pass them to dispatcher 444 or some other component of client agent 440 for execution. Illustratively, the statements may cause new or updated data to be stored in database 420.

Figure 5A:
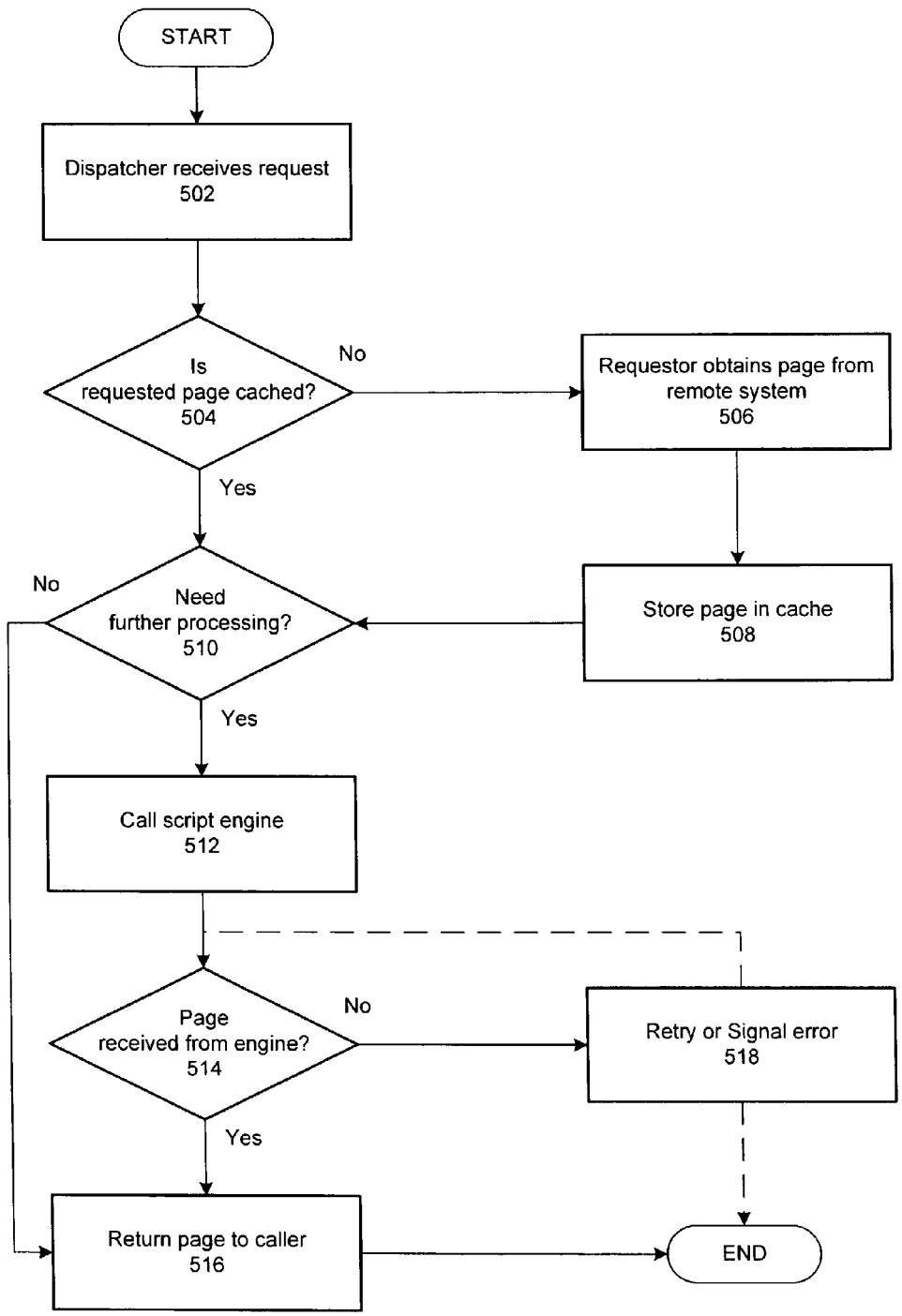
FIG. 5A is a flowchart demonstrating a method of operating a dispatcher, within an intelligent client agent, to process a requested page, in accordance with an embodiment of the invention.
Figure 5B:
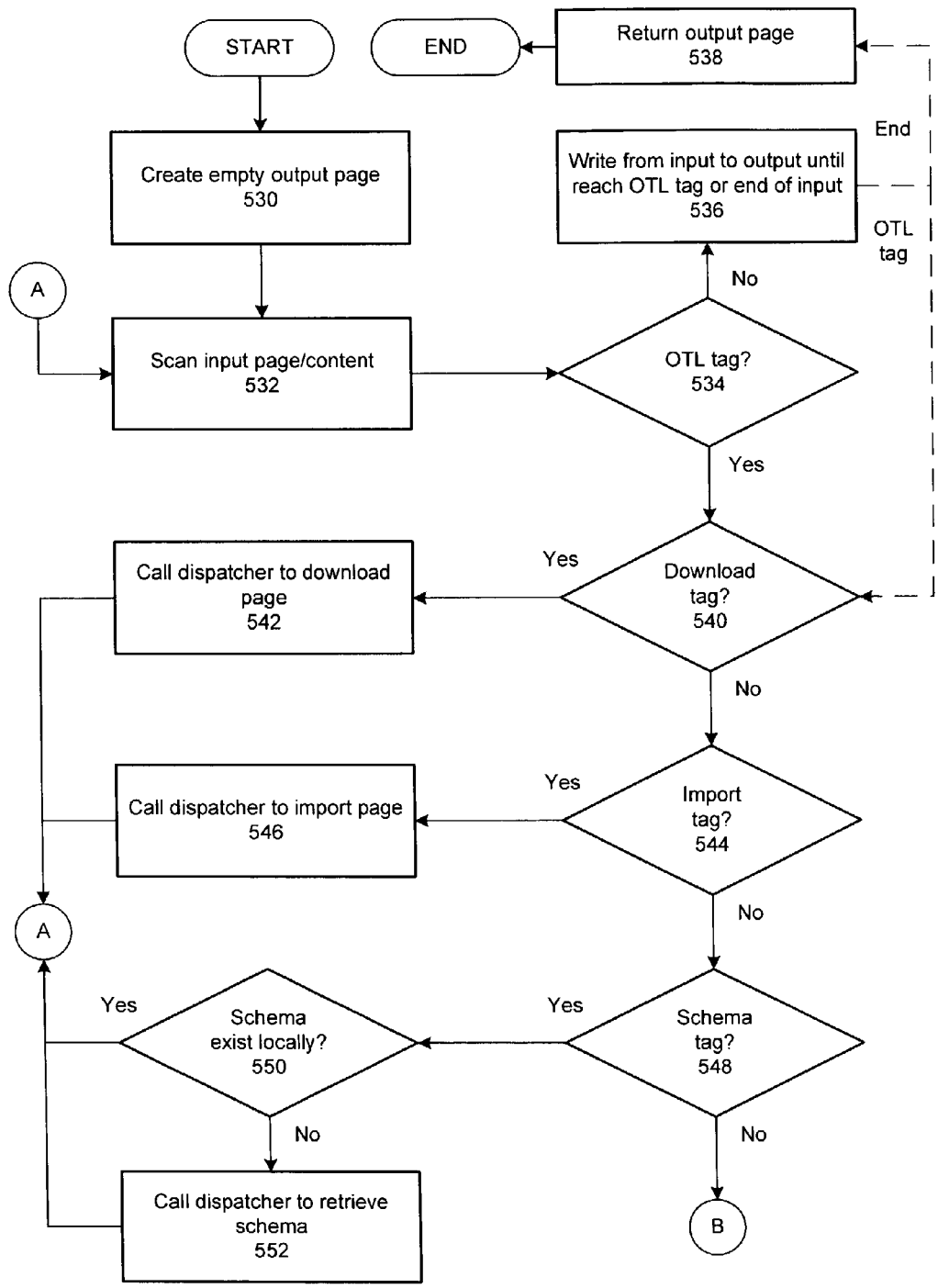
FIGS. 5B-C comprise a flowchart demonstrating a method by which a script engine may assemble a page within an intelligent client agent, in accordance with an embodiment of the invention.
Figure 5C:
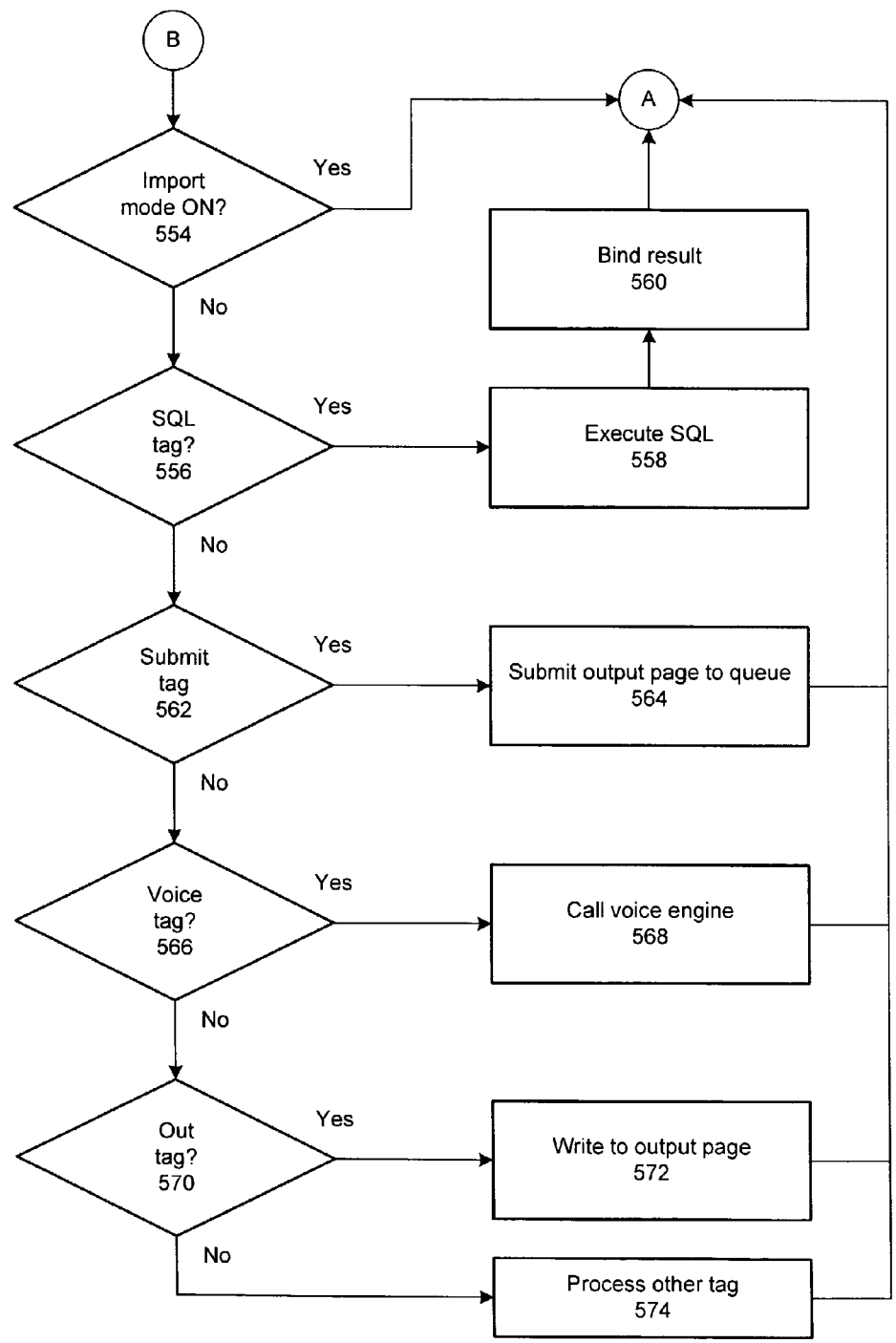

FIGS. 5A-C depict methods of operating a mobile application with an intelligent client agent, according to one embodiment of the invention. In this embodiment, the mobile application is executed on a mobile or portable (e.g., wireless)

computing device (such as client device 400 of FIG. 4). The mobile application is configured for offline operation (e.g., without any active connection to a remote server or other computer system), but can take advantage of an available connection to retrieve data that are stale or unavailable (e.g., not stored on the mobile device).

FIG. 5A demonstrates a method of operating a dispatcher (e.g., dispatcher 444 of FIG. 4). FIGS. 5B-C demonstrate a method of operating a script engine (e.g., script engine 446 of FIG. 4).

In state 502 of FIG. 5A, the intelligent client agent (e.g., dispatcher 444 of FIG. 4) receives a request from a caller, typically the client browser. Illustratively, the request may be submitted in one of a set of predetermined protocols (e.g., OMC) associated with the client agent.

In state 504, the dispatcher determines whether the requested page or other item is currently cached. In particular, the dispatcher may examine a client agent cache (e.g., cache 442 of FIG. 4) to determine if it contains a presentation description or format for the requested page. If a format for the requested page is in the cache, the illustrated method proceeds to state 510.

Otherwise, if not cached, then in state 506 the client agent forwards the request to a requestor (e.g., requestor 450 of FIG. 4) to pass to a remote system. If the mobile device is currently offline, this state may entail queuing the request until a connection is available.

In state 508, a page (e.g., a presentation page) returned from the remote server is put into the cache.

In state 510, the dispatcher determines whether the requested page should be returned as-is to the caller (e.g., the browser) or whether it should be sent to one of the handlers for further processing. Illustratively, if the page is an OTL page, the dispatcher will call the script engine, which acts as the handler of OTL pages. If no further processing is required, the illustrated method proceeds to state 516.

In state 512, the dispatcher invokes a handler (e.g., the script engine) to process the page. FIG. 5B demonstrates one method according to which the script engine may operate.

In state 514, the dispatcher checks to see if the handler has returned a page. If not, the method advances to state 518.

In state 516, the requested page is delivered to the caller. The illustrated dispatcher method then ends.

In state 518, the dispatcher may signal an error, thus ending the method. Or, the dispatcher may wait an additional period of time for the page to be provided by the handler or may retry the operation.

FIG. 5B depicts the operation of an OTL handler, such script engine 446 of FIG. 4, according to one embodiment of the invention. In this embodiment, the script engine receives an OTL page as input. OTL pages typically contain the presentation format of a page. The presentation format may serve as a sort of page template. Instead of containing actual data, however, the data are represented by their variables, field or column names, table names or other placeholders. The OTL page may contain tags to download other pages or resources (e.g., an image file), tags to create the database schema if needed, tags to interact with the voice engine, tags to execute SQL statements and bind the result to variables, tags to write the value of the variables to the output file, and tags that provide the flow control needed to program the generation of the output page.

In state 530, the OTL handler creates an empty output page. As the illustrated method proceeds, the output page will be populated with content from the input page and/or other content.

In state 532, it starts scanning the input page or content. Illustratively, the scanning may be performed tag-by-tag.

In state 534 it examines a tag to see if it is an OTL tag. If it is an OTL tag, the method continues at state 540.

Otherwise, in state 536, the tag is not an OTL tag and so the script engine copies characters from the input page to the output page until an OTL tag is encountered in the input or the end of the page is reached. If an OTL tag is reached, the method advances to state 540.

Otherwise, if the end of the input is reached, in state 538 the output page is closed and returned to the caller (e.g., the dispatcher), and the method ends. The output page may be empty.

In state 540, the script engine tests the tag to see if it is a "download" tag. If not, the method continues at state 544.

But, if the tag is a download tag, then in state 542 the script engine calls the dispatcher to download the page at the URL given as an attribute to the download tag. In the illustrated embodiment of the invention, a downloaded page is not parsed or executed at this point. After downloading the page, the script engine returns to state 532.

In state 544, the tag is tested to see if it is an "import" tag. If not, the method advances to state 548.

Otherwise, if the tag is an import tag, in state 546 the dispatcher is called to import a page associated with a URL provided as an attribute to the import tag.

Illustratively, the script engine sets an import mode to "on." Turning the import mode "on" indicates to the dispatcher and possibly to the script engine (if the dispatcher makes the call to the script engine) that it is processing an import page. The script engine then makes a recursive call to the dispatcher and provides the URL of the page to be imported. When the dispatcher returns control to the script engine, the import mode is set to "off" and the illustrated method resumes at state 532.

In state 548, if the tag is not an "import" tag then the script engine tests the tag to see if it is a "schema" tag. If not a schema tag, the method advances to state 554.

In state 550, the script engine examines a local database to see if the schema already exists. If it does, the method returns to state 532.

Otherwise, in state 552 the script engine calls the dispatcher to process the page at the URL given by the "schema" tag. After state 552, the method returns to state 532.

In state 640 the script engine determines whether import mode is on or off. If the import mode is on, this indicates that the page being processed is a download page. Therefore, the script engine will not attempt to process the other tags in the page and will instead resume operation from state 520. Illustratively, this helps ensure that imported pages are not executed right away and that any pages they depend on are also downloaded or imported and any schema they depend on are created.

In state 556, the OTL tag is examined to see if it an "SQL" tag. If not, the method proceeds to state 562.

Otherwise, in state 558 the script engine calls the client DBMS to execute the query that accompanies the tag.

Then, in state 560 the script engine binds the result of the query (e.g., a table) to the variable included in the "SQL" tag. The method then returns to state 532 where it continues the scanning of the input page.

In state 562, if the tag encountered is not a "submit" tag, the script engine advances to state 566.

Otherwise, in state 564, the script engine responds to the submit tag by submitting the output page to the queue (e.g., queue 452 of FIG. 4), which will forward the page to a specified server.

In this embodiment of the invention, the submit tag has at least three attributes. The first attribute is the URL of the server to which the page is submitted. The second attribute identifies the return code from the server that will indicate a successful submission. The third is the URL of the page that will be called if the return code from the server is anything other than the code identified in the second attribute.

When the Queue has a connection to the server, it will submit any queued requests. If there is an error, it will call the error-handling page and pass it the URL of the server and the returned code.

In state 566, the tag is examined to see if it is a voice tag. If not, the illustrated method advances to state 570.

Otherwise, if it is a voice tag, in state 568 the script engine prepares parameter values, from variables in the script, to call the necessary voice engine methods. As the result of calling the method, the voice engine will speak a message to the user (if the voice tag was a "say" tag) or aurally prompt the user for an input (if the tag was a "prompt" tag). If the tag is a prompt, then the voice engine will accept aural input and then try to recognize it and translate it into a text string. This text string is returned as the result of the method. The script engine then returns to state 532 to continue scanning the input page.

In state 570, the script engine tests the tag to see if it is an "out" tag. An "out" tag tells the script engine to output a value (a constant or a value bound to a variable).

If the tag is an "out" tag, in state 572 the script engine writes the value to the output page and then returns to state 532.

If the tag is not an "out" tag, then in state 574 the script engine processes it as one of the statements that it supports and then returns to state 532.

While implementing the method of FIGS. 5B-C, the script engine retrieves the data for the requested page. For example, if the data are currently stored in a client database (e.g., in a table, cache table or snapshot) and are valid, they may be retrieved from the database during state 558. However, if any data items are not currently in the database, or if a necessary data item is stale, then the client engine may initiate a connection to a remote system to retrieve one or more data item(s). In this method of the invention, it may be noted that the connection to the remote system is minimized by retrieving just the necessary data. In particular, the client engine may avoid downloading other data (e.g., data that are locally available and not stale) and non-data components (e.g., the presentation description or format) of the requested page.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of operating an application on a client mobile computing device, comprising:
   receiving on the client mobile computing device:
      a database snapshot which describes a data set in a remote database; and
      a presentation format for a first application page that describes how the content of the database snapshot is presented;
   receiving at a client agent residing on the client mobile computing device a request from a client browser for the first application page;
   using a push listener of the client agent to receive a message that the server pushes to the client mobile computing device, wherein the pushed message includes a SQL statement which is executed by the client mobile computing device to update the database snapshot;
   producing the first application page at the mobile computing device offline by applying a script engine of the client agent to the presentation format; and
   presenting the produced application page at the mobile computing device in response to the request.

2. The method of claim 1, wherein presenting the produced application page comprises playing the first application page in an audible form.

3. The method of claim 1, wherein presenting the produced application page comprises displaying the application page in the client browser.

4. The method of claim 3, further comprising, if a data item in said first set of data items is invalid:
   accessing a remote computer system;
   retrieving an updated version of a data item without retrieving said presentation format;
   updating said data item with said updated version; and
   retrieving said set of data, including said updated data item, from the database.

5. The method of claim 1, further comprising, prior to said receiving the presentation format:
   reviewing a download page configured to identify one or more components of the application, including said application page.

6. The method of claim 5, wherein reviewing the download page involves automatically initiates said receiving the presentation format.

7. The method of claim 5, wherein said download page initiates said storing of said presentation format.

8. The method of claim 7, wherein said reviewing comprises browsing said download page with a browser on the mobile computing device.

9. The method of claim 1, wherein the application is operated in an offline mode during said method.

10. The method of claim 1, wherein the application is operated in an offline mode during said method except for retrieving stale content from the remote data set.

11. The method of claim 1, further comprising:
    receiving from a request for a second page of the application;
    determining that a presentation format of the second page is not available on the mobile computing device; and
    queuing the request for the second page for transmission to a remote computer system.

12. The method of claim 1, wherein combining said presentation format and the set of data comprises:
    using said data descriptors to search the mobile device database on the mobile computing device;
    locating the set of data in the mobile device database;
    determining the validity of the set of data at the mobile computing device; and
    for a valid set of data, retrieving the set of data from the mobile device database.

13. The method of claim 1, further comprising:
    determining at the client mobile computing device whether said first page is to be presented in graphical or voice format.

14. A non-transitory computer readable storage medium storing instructions that, when executed by a computer, cause the computer to perform a method of operating an application on a client mobile computing device, the method comprising:
    receiving on the client mobile computing device:
       a database snapshot which describes a data set in a remote database; and a presentation format for a first application page that describes how the content of the database snapshot is presented;

receiving at a client agent residing on the client mobile computing device a request from a client browser for the first application page;

using a push listener of the client agent to receive a message that the server pushes to the client mobile computing device, wherein the pushed message includes a SQL statement which is executed by the client mobile computing device to update the database snapshot;

producing the first application page at the mobile computing device offline by applying a script engine of the client agent to the presentation format; and presenting the produced application page at the mobile computing device in response to the request.

15. A client mobile computing device for operating an offline application, the device comprising:

a client browser configured for interaction with a user to operate the application, wherein the application comprises one or more pages;

a page cache configured to store a presentation format of a first page of the application, wherein said presentation format is distinguishable from data that are presentable with said presentation format;

a database configured to store a first set of data items presentable with said presentation format, said database comprising a cache table containing said first set of data items and cache control information configured to indicate the validity of said first set of data items;

wherein the database is further configured to receive:
 a database snapshot that describes a data set in a remote database; and
 a presentation format for the first application page that describes how to present the content of the database snapshot;

a dispatcher at the client mobile computing device configured to receive at a client agent residing on the mobile computing device a first request for said first page of the application from the client browser;

a push listener of the client agent configured to receive a message that the server pushes to the client mobile computing device, wherein the pushed message includes a SQL statement which is executed by the client mobile computing device to update the database snapshot;

a script engine at the client mobile computing device configured to dynamically produce the first page at the client mobile computing device offline by applying a script engine of the client agent to the presentation format; and a presenter configured to produce the first page at the mobile computing device in response to the request.

16. The mobile computing device of claim 15, wherein said script engine is further configured to dynamically assemble said presentation format and a second set of data items in response to a second request for the first page.

17. The mobile computing device of claim 15, wherein said database comprises:
 a snapshot of data, including said first set of data items, copied from another computing device;
 wherein said data are periodically synchronized with the other computing device.

18. The mobile computing device of claim 15, wherein said script engine comprises:
 a first engine configured to dynamically assemble said presentation format and said first set of data items in a graphical format.

19. The mobile computing device of claim 15, wherein said script engine comprises:
 a voice engine configured to execute voice tags in said presentation format and said first set of data items.

20. The mobile computing device of claim 15, further comprising:
 a listener configured to receive a transmission originated by another computing device;
 wherein said listener is further configured to update one or more of said page cache and said database with a portion of the transmission.

21. The mobile computing device of claim 15, further comprising:
 a requestor configured to forward the request for the first page to another computing device.

22. The mobile computing device of claim 21, further comprising:
 a queue configured to store the request for the first page until a connection is available to the other computing device.

* * * * *

UNITED STATES PATENT AND TRADEMARK OFFICE
CERTIFICATE OF CORRECTION

| | |
|---|---|
| PATENT NO. | : 8,245,128 B1 |
| APPLICATION NO. | : 10/197738 |
| DATED | : August 14, 2012 |
| INVENTOR(S) | : Ahad et al. |

It is certified that error appears in the above-identified patent and that said Letters Patent is hereby corrected as shown below:

On Title page 2, in column 1, under "Other Publications", delete "publisheer:" and insert -- publishers: --, therefor.

On sheet 2 of 15, Box No. 210, in figure 2, line 1, delete "APPLICATON" and insert -- APPLICATION --, therefor.

In column 5, line 12, delete "though" and insert -- through --, therefor.

In column 6, line 52, delete "(patt#))" and insert -- (part#)) --, therefor.

In column 7, line 48, delete "part Name," and insert -- partName, --, therefor.

Signed and Sealed this
Sixth Day of November, 2012

David J. Kappos
*Director of the United States Patent and Trademark Office*